United States Patent
Hellwig et al.

(10) Patent No.: US 7,148,161 B2
(45) Date of Patent: Dec. 12, 2006

(54) THERMAL CAMOUFLAGE TARPAULIN

(75) Inventors: Manfred Hellwig, Oehringen (DE); Joerg Weber, Finkenweg (DE)

(73) Assignee: Ploucquet Textiles Zittau GmbH, Zittau (DE)

( * ) Notice: Subject to any disclaimer, the term of this patent is extended or adjusted under 35 U.S.C. 154(b) by 466 days.

(21) Appl. No.: 10/622,820

(22) Filed: Jul. 18, 2003

(65) Prior Publication Data

US 2004/0152385 A1 Aug. 5, 2004

(30) Foreign Application Priority Data

Aug. 14, 2002 (DE) .............................. 202 12 487

(51) Int. Cl.
*B32B 5/02* (2006.01)
*B32B 27/06* (2006.01)
*D03D 15/00* (2006.01)

(52) U.S. Cl. ............... 442/131; 442/230; 442/236; 428/919

(58) Field of Classification Search .......... 442/230, 442/181, 304, 236, 131; 428/411.1, 423.7, 428/425.5, 450, 694 DE, 689, 919
See application file for complete search history.

(56) References Cited

U.S. PATENT DOCUMENTS

| 4,557,965 A | 12/1985 | Karlsson |
| 4,560,595 A | 12/1985 | Johansson |
| 4,560,608 A * | 12/1985 | Pusch et al. ............... 428/196 |

FOREIGN PATENT DOCUMENTS

| DE | 297 16 362 U1 | 2/1998 |
| DE | 29805867 | * 3/1998 |
| DE | 297 16 362.0 | 8/1998 |
| EP | 1 096 604 A1 | 5/2001 |

* cited by examiner

*Primary Examiner*—Terrel Morris
*Assistant Examiner*—Lynda Salvatore
(74) *Attorney, Agent, or Firm*—Davis & Bujold, P.L.L.C.

(57) ABSTRACT

A thermal camouflage tarpaulin for hiding heat sources against detection in a thermal image, comprising a base textile composed of a loop-formingly knitted or woven glass fabric is provided on the side which is remote from the heat source with a compound whose reflectance values are in the region of a visual camouflage and/or in the infrared region. Said base textile is provided on that side which faces the heat source with a free-standing polyester film to which has been applied a vapor-deposited coating which reflects thermal radiation.

17 Claims, 1 Drawing Sheet

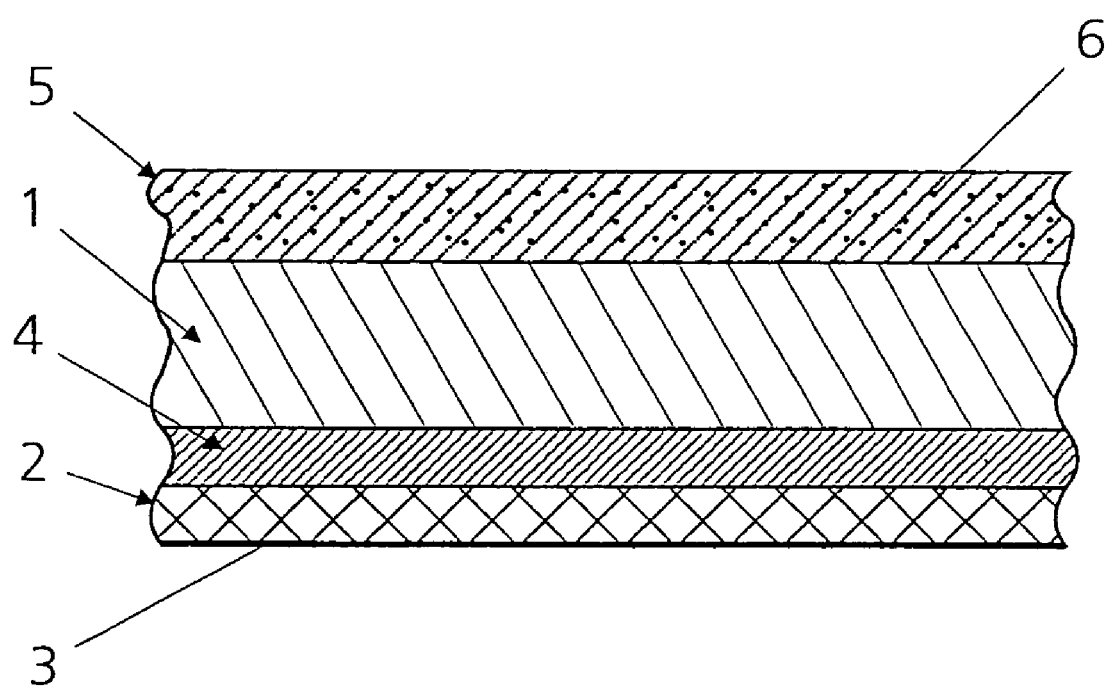

THERMAL CAMOUFLAGE TARPAULIN

BACKGROUND OF THE INVENTION

1. Field of the Invention

This invention relates to a thermal camouflage tarpaulin for hiding heat sources against detection in a thermal image, comprising a base textile composed of a loop-formingly knitted or woven glass fabric provided on the side which is remote from the heat source with a compound whose reflectance values are in the region of a visual camouflage and/or in the infrared region.

2. Description of the Related Art

A thermal camouflage tarpaulin of this kind is described in DE 297 16 362.0. It is intended to cover hot spots, for example the engine of a motor vehicle or else of a stationary facility, in such a way that they cannot be localized.

The camouflage tarpaulin is generally used underneath camouflage nets which effect a camouflage against infrared cameras or thermal imagers and against radar detection. The camouflage net is effective in preventing microwaves which are incident upon an object being reflected back by the object. Similarly, identification is thereby avoided by means of sensors in infrared or thermal image region.

However, the camouflaging performance afforded by the camouflage net becomes problematical when there are hot spots, such as the engine of a motor vehicle for example. This is where the thermal camouflage tarpaulin mentioned at the beginning comes in; it stops heat rays from objects which are situated on that side of the thermal camouflage tarpaulin which is coated with silicone elastomer comprising aluminum powder passing through unhindered and thus being localizable by means of a thermal imager despite any camouflage net placed on top. On that side which is remote from the heat source is a polyurethane or silicone elastomer comprising color pigments for camouflage against visual detection. At the same time, an appropriate surface color design can be achieved in this way that is adapted to the environment and/or a superposed camouflage net.

SUMMARY OF THE INVENTION

It is an object of the present invention to further improve the previously known thermal camouflage tarpaulin with regard to its performance, especially against detection by solar radiation and also by long-wave thermal radiation in the ranges 3 to 14 µm, since these are the ranges in which thermal imaging detectors normally operate.

This object is achieved according to the invention when the base textile is provided on that side which faces the heat source with a free-standing polyester film to which has been applied a vapor-deposited coating which reflects thermal radiation.

Whereas the previously known thermal camouflage tarpaulin provides a reflectance of above 50% only in the region of solar radiation (maximally up to about 5 µm), the performance is lower in the range from 8 to 14 µm.

It has now been determined that the thermal camouflage tarpaulin according to the present invention provides a high performance not only in the wavelength region of solar radiation up to 6 µm, but also in the range from 8 to 14 µm. It has further been determined that a very high reflectance of consistently above 80% is achieved against solar radiation or thermal radiation, and so overall a high performance is achieved in the range from about 2 to 14 µm. This provides performance not only with regard to active signatures due to thermal imaging cameras which emit radiation but also with regard to passive signatures concerning solar warming (self-radiation) due to thermal imaging cameras which record heat emitted by the hot spot.

Advantageous developments and refinements will be apparent from the subsidiary claims and from the illustrative embodiment described hereinbelow with reference to the drawing.

DESCRIPTION OF THE DRAWING

In the drawing, the thermal camouflage tarpaulin according to the present invention is depicted in partial, much magnified and simplified form. It comprises a base textile 1 which comprises loop-formingly knitted or woven glass fabric. The woven glass fabric has a cross twill construction and a basis weight in the range from 300 to 500 $g/m^2$ and preferably 400 $g/m^2$. This provides a high flexing resistance. The base textile 1 is coated on one side with a free-standing polyester film 2 which is laminated with a vapor-deposited coating (in the form of an aluminum coating 3) which reflects thermal radiation.

The lamination or adhering is effected by means of a polyurethane or silicone layer 4. It will be appreciated, however, that any other kind of adhesive can be used as well for the adhering. The thickness of the adhesive layer can be between 40 and 80 $g/m^2$ and preferably between 50 and 60 $g/m^2$. The reverse side, i.e., the side which is remote from the heat source, is directly coated with a compound 5. The compound 5 can comprise polyurethane polymers or silicone elastomers. The compound has been provided with IR pigments, such as metal pigments 6 for example, to achieve camouflage in the visible and in the near infrared region. Examples of metal pigments which can be used are chromium oxides. Additionally, the compound 5 has been provided with known flame retardants. The basis weight of the compound can be between 60 and 125 $g/m^2$ and preferably between 80 and 100 $g/m^2$. The construction of the camouflage tarpaulin using the basis weights mentioned additionally provides high flexibility over a broad temperature range coupled with very good mechanical strength and low flammability.

The camouflage tarpaulin according to the present invention provides a high reflectance of above 80% not only with regard to solar radiation but also with regard to thermal radiation from the heat source.

What is claimed is:

1. A thermal camouflage tarpaulin for hiding a heat source against detection in a thermal image, the tarpaulin comprising;
   - a base textile having a first side and a second opposite side, the textile being one of a loop knitted or a woven glass fabric;
   - a compound containing IR pigments is supported on the first side of the base textile, the compound having reflectance values in one or more of a region of a visual camouflage and an infrared region; and
   - a free-standing polyester film is fixed to the second opposite side of the base textile, and an exposed face of the free-standing polyester film has a vapor-deposited coating defining an outer surface of the thermal camouflage tarpaulin which directly reflects thermal radiation.

2. The thermal camouflage tarpaulin according to claim 1, wherein the vapor-deposited coating is aluminum.

3. The thermal camouflage tarpaulin according to claim 1, wherein an adhesive layer connects the free-standing polyester film to the base textile.

4. The thermal camouflage tarpaulin according to claim 3, wherein the adhesive layer comprises polyurethane.

5. The thermal camouflage tarpaulin according to claim 3, wherein the adhesive layer comprises silicone.

6. The thermal camouflage tarpaulin according to claim 3, wherein the adhesive layer has a basis weight of approximately between 40 and 80 g/m².

7. The thermal camouflage tarpaulin according to claim 6, wherein the adhesive layer has a basis weight of approximately between 50 and 60 g/m².

8. The thermal camouflage tarpaulin according to claim 1, wherein the compound comprises polyurethane polymers which include metal pigments.

9. The thermal camouflage tarpaulin according to claim 1, wherein the compound comprises silicone elastomers which include metal pigments.

10. The thermal camouflage tarpaulin according to claim 8, wherein the compound has a basis weight in a range from 60 to 120 g/m².

11. The thermal camouflage tarpaulin according to claim 10, wherein the compound has a basis weight in a range from 80 to 100 g/m².

12. The thermal camouflage tarpaulin according to claim 1, wherein the base textile has a basis weight in the range from 250 to 500 g/m² and preferably 400 g/m².

13. The thermal camouflage tarpaulin according to claim 1, wherein said base textile comprises woven glass fabric in cross twill construction.

14. The thermal camouflage tarpaulin according to claim 1, wherein the base textile has a basis weight of about 400 g/m².

15. The thermal camouflage tarpaulin according to claim 1, wherein the tarpaulin has a reflectivity of both solar radiation and thermal radiation above approximately 80%.

16. A thermal camouflage tarpaulin for hiding a heat source against detection in a thermal image, the tarpaulin comprising;
    a base textile having a first side and a second side, the textile being one of a loop knitted or a woven glass fabric;
    a compound applied solely to the first side of the base textile, the compound comprising;
        one of polyurethane and silicone elastomers;
        metal IR pigments provided in the compound having reflectance values in one or more of a region of a visual camouflage and an infrared region; and
    a free-standing polyester film is affixed to the second side of the base textile, and an exposed face of the free-standing polyester film has a vapor-deposited aluminum coating defining an outer surface of the thermal camouflage tarpaulin which directly reflects thermal radiation.

17. A thermal camouflage tarpaulin for hiding a heat source against detection in a thermal image,: the tarpaulin comprising;
    a base textile being one of a loop knitted or a woven glass fabric;
    an inner side to be placed immediately adjacent the heat source and an outer side to be placed remote from the heat source;
    the outer side of the thermal camouflage tarpaulin comprising a compound applied solely to the outer side of the base textile, the compound comprising;
        one of polyurethane and silicone elastomers;
        metal IR pigments provided in the compound having reflectance values in one or more of a region of a visual camouflage and an infrared region; and
    the inner side comprising;
        a free-standing polyester film affixed to the base textile, and a face of the free-standing polyester film has a vapor-deposited aluminum coating defining an exposed surface of the thermal camouflage tarpaulin;
    wherein the exposed surface of the vapor-deposited aluminum coating on the inner side of the thermal camouflage tarpaulin is positioned immediately adjacent the heat source so as to directly reflect thermal radiation from the heat source.

* * * * *

UNITED STATES PATENT AND TRADEMARK OFFICE
CERTIFICATE OF CORRECTION

PATENT NO. : 7,148,161 B2
APPLICATION NO. : 10/622820
DATED : December 12, 2006
INVENTOR(S) : Manfred Hellwig and Joerg Weber Page 1 of 1

It is certified that error appears in the above-identified patent and that said Letters Patent is hereby corrected as shown below:

On the title page item

(75)  Inventors:  Change "Joerg Weber, Finkenweg (DE)" to
-Joerg Weber, Koeditz (DE)-.

Signed and Sealed this

Third Day of February, 2009

JOHN DOLL
*Acting Director of the United States Patent and Trademark Office*